Oct. 10, 1939.　　　　J. D. RUST　　　　2,175,216
SELF-PROPELLED TANDEM COTTON PICKING MACHINE
Filed March 21, 1938　　　4 Sheets-Sheet 1
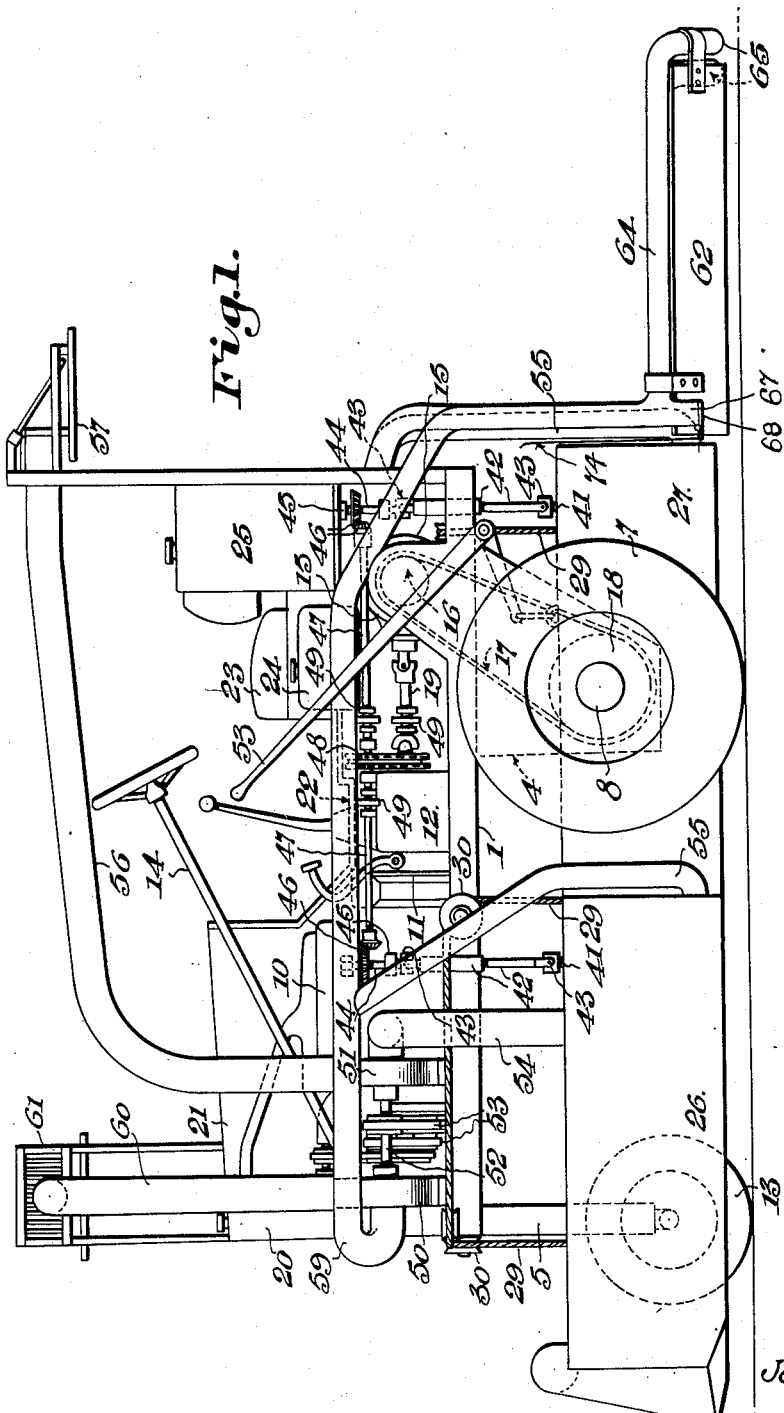
Inventor
John D. Rust
By Albert E. Dieterich
and
Theodor H. Rutley　Attorneys

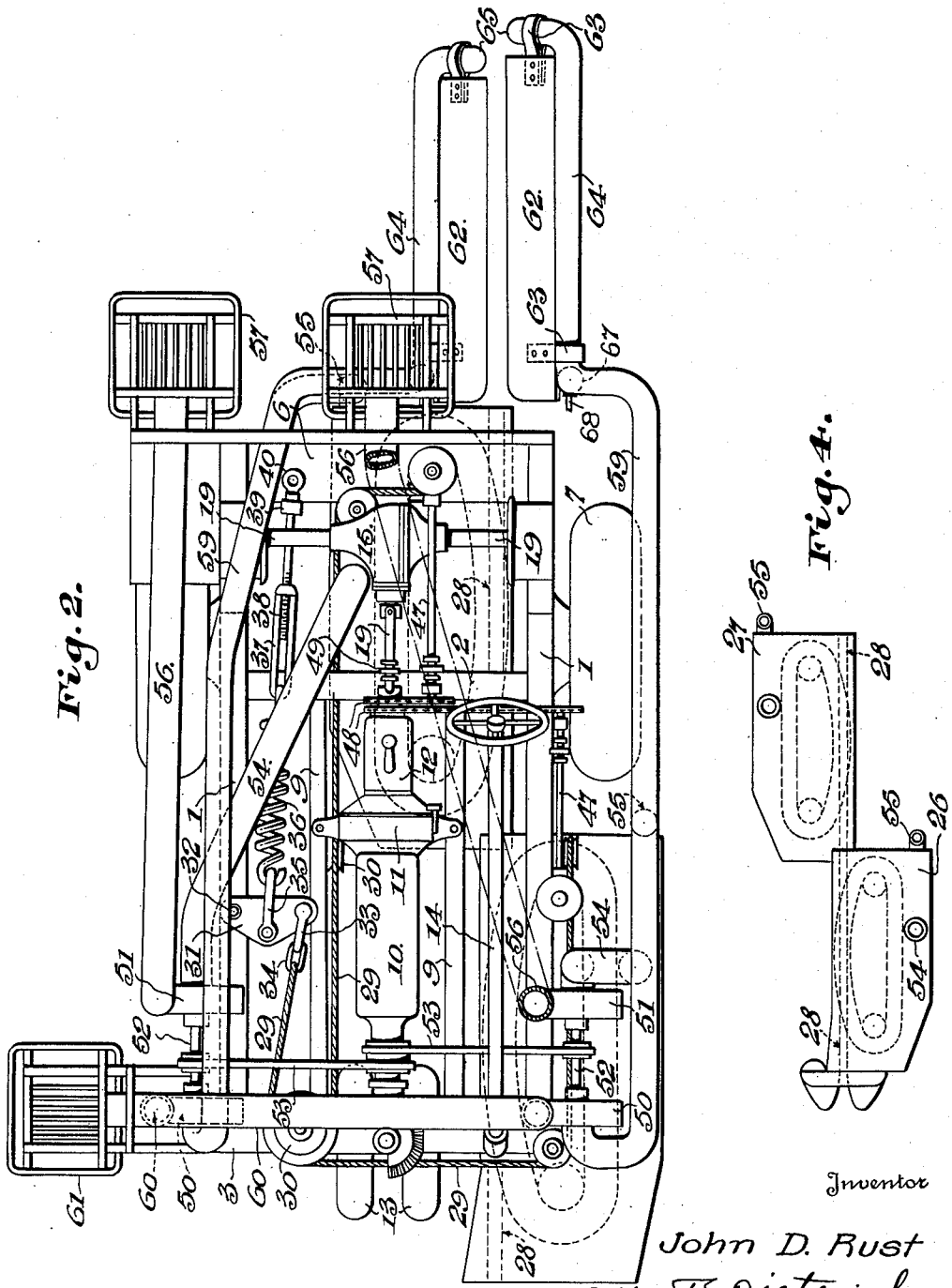

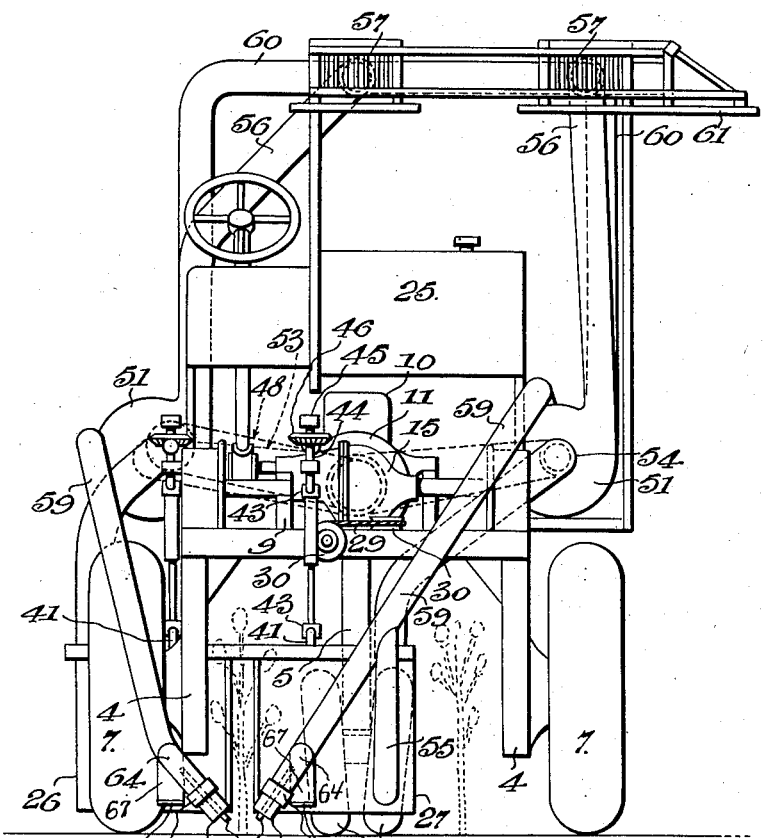

Oct. 10, 1939.    J. D. RUST    2,175,216
SELF-PROPELLED TANDEM COTTON PICKING MACHINE
Filed March 21, 1938    4 Sheets-Sheet 4

Inventor
John D. Rust
By Albert E. Dieterich
and
Theodore H. Rutley
Attorneys.

Patented Oct. 10, 1939

2,175,216

UNITED STATES PATENT OFFICE 2,175,216

SELF-PROPELLED TANDEM COTTON PICKING MACHINE

John D. Rust, Memphis, Tenn.

Application March 21, 1938, Serial No. 197,245

14 Claims. (Cl. 56—14)

My invention relates to machines for gathering cotton from the plants, and it particularly has reference to machines of the types disclosed in the following Letters Patent to myself and Mack D. Rust: No. 1,894,198, Jan. 10, 1933; Reissue No. 14,911, Jan. 1, 1935; No. 2,023,491, Dec. 10, 1935; No. 2,058,513, Oct. 27, 1936; No. 2,058,514, Oct. 27, 1936; and No. 2,073,653, Mar. 16, 1937.

More particularly, the invention relates to those pickers which include a tractor designed to straddle two rows of plants, the picking unit or units being suspended from the tractor, or otherwise suitably mounted thereon.

Field experience has shown that the unit, on being passed once along a row of cotton, does not remove all the available cotton under all conditions, making it necessary to pass the machine a second time over the rows of plants. It is one of the objects of the present invention to overcome this deficiency so that a single trip of the machine will remove practically all of the cotton from the plants. This I accomplish by providing two picking units and connecting them in tandem.

A further object is to provide a double unit machine with a right hand and a left hand unit that may be arranged either in one row tandem position and carried under the axle of the tractor, as illustrated in the accompanying drawings, or arranged for a two row machine similar to the one illustrated in Patent No. 1,894,198 issued to J. D. Rust et al.

The picking units employed in my present machine may be of the same general construction as those in the aforesaid patents, save that the plant guides of the second unit are omitted and the two units are so coupled together that the plant tunnel of the second lines up with that of the first and the plants pass from the first tunnel directly into the second tunnel without interruption.

A further object is to provide a self-propelled machine comprising cotton picking mechanism combined with a tractor designed to straddle two rows of plants and having a wide frame of sufficient height to allow the picking mechanism to be carried underneath the body of the tractor.

A further object is to provide separate containers for the cotton delivered from the front and rear units so that the grade of the cotton picked by the first unit will not be lowered by the cotton picked by the second unit which is usually of a lower grade.

Again, it is an object to provide a salvaging means to pick up cotton that is slung off the spindles as they come around the rear sprockets and the cotton that falls to the ground.

Further, it is an object to provide means separately to collect the cotton gathered by the first and second units and to collect at a third place the cotton which falls to the bottom of the two units and to the ground.

In use this tandem machine separates the harvested cotton into three grades: the first unit usually gathers about seventy-five per cent of the open cotton and it is a somewhat better grade than that picked by the second unit. The cotton gathered by the first unit is delivered into one sack; that gathered by the second unit is delivered into another sack; and all the salvaged cotton is delivered into a third sack, the aggregate of the values obtainable for the three separate grades being higher than would be the value of the same cotton all delivered into one sack.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is a side elevation, somewhat schematic, showing the present invention.

Fig. 2 is a top plan view, parts being omitted to show those beneath.

Fig. 3 is a rear elevation.

Fig. 4 is a plan view of the tandem picker units per se.

Fig. 8 is an enlarged detail section, showing dirt trap for duct 59—64.

Fig. 9 is a section on line 9—9 of Fig. 10.

Fig. 10 is an elevation of a modified means to discharge dirt from the dirt trap.

Figure 5:
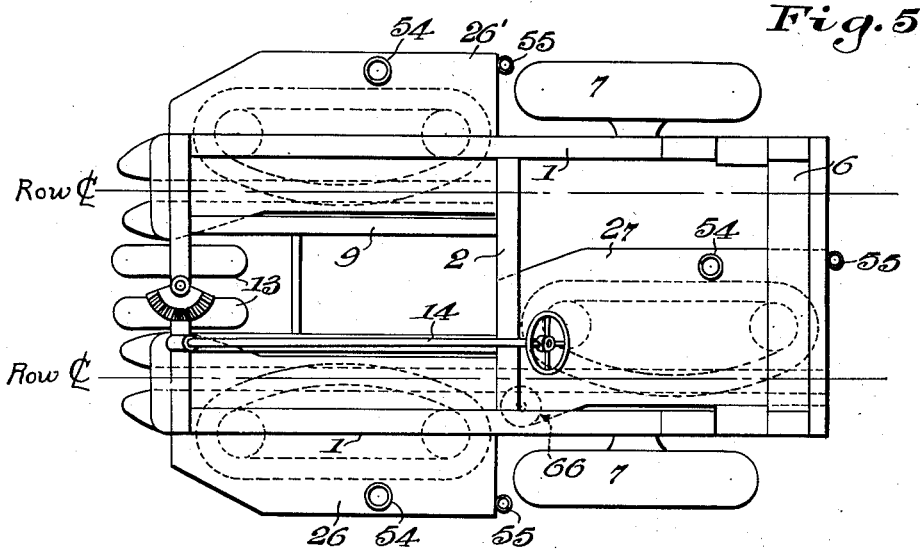
Fig. 5 is a diagrammatic plan view of a modification of the invention.
Figure 6:
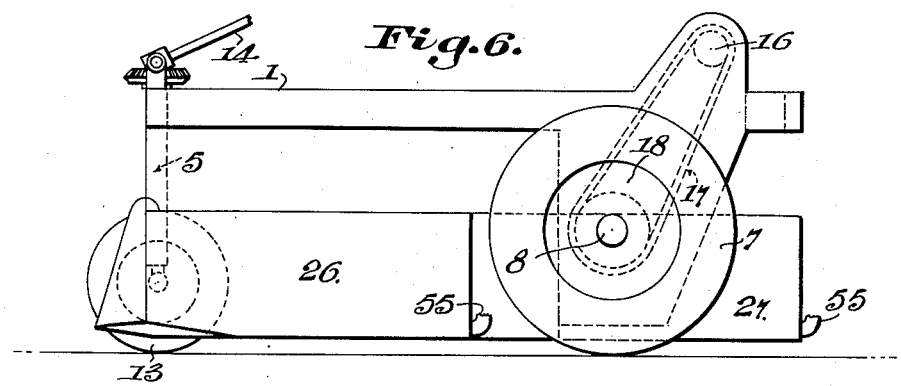
Fig. 6 is a diagrammatic side elevation of the same.

In the drawings, in which like numerals of reference indicate like parts in all of the figures, 1 represents the side beams of the main frame of the tractor, 2 the intermediate cross beam, 3 the front cross beam, 6 the rear cross beam, 4 the rear wheel supporting brackets, 5 the front steering wheel post, 7 the rear or traction wheels, and 8 the stub axles for the wheels 7.

The engine 10 is carried on supplemental frame bars 9. The flywheel and clutch housing is indicated by 11, the transmission gear box by 12, the caster (steering) wheels by 13, and the steering gear by 14.

The traction wheels 7 are each driven by a sprocket and chain drive 16, 17, 18 from the rear axle assembly 15, which is in turn driven by a drive shaft 19 coupled to the transmission by a suitable clutch 49.

The usual radiator 20, hood 21, floor 22, and seat 23 for the operator, are provided.

Suitable tanks 24, 25 are provided for water and gasoline.

The foregoing comprise the principal parts of an elevated frame tractor designed to straddle two rows of plants.

The picking or gathering units 26 and 27 are carried beneath the frame of the tractor. These units 26 and 27 are each of substantially the same construction save that one is a right and one is a left.

In general, each unit 26 and 27 may include a housing within which is the necessary mechanism for picking the cotton from a row of plants.

Each housing has a longitudinal passage at one side thereof to receive the plant row, and contains the picking spindles rotatably mounted in and carried by an endless spindle carrier which travels in a longitudinally elongated path that bulges toward the plants of the row being picked. Through the horizontal spaces between the stalk guards, which form one wall of the housing, the spindles project into and across the plant receiving passage. The motion of the spindle carrier, due to the shape of the path it follows, causes the spindles uniformly to penetrate the plants for the picking operation and to be gradually withdrawn therefrom as the picking is finished.

Rotation of the picking spindles while in contact with the plants is effected, incident to the movement of the endless spindle carrier, by means of frictional racks which engage rollers on the inner ends of the spindles.

Moisture, preferably water, which is automatically applied to the surfaces of the smooth spindles prior to their contact with the plants, causes the fibers of the open cotton bolls to adhere thereto and to become wound about the spindles as they rotate.

Opposite the picking side of the elongated path of the spindle carrier, are provided stripping means for removing from the spindles the cotton collected thereon, and suitable means for conveying this cotton to a receptacle from which it may be discharged at convenient intervals.

The speed of travel of the spindle carrier, and the consequent movement of the spindles in the backward direction during contact with the plants, is approximately equal to the speed of the forward travel of the machine whereby the spindles, while in the plants, rotate in a position approximately stationary with relation to the plants.

Each unit 26 and 27 may embody the constructions and improvements of the Letters Patent aforesaid.

In carrying out my invention, the second unit 27 is coupled (preferably rigidly) to the rear of the first unit 26 in such manner that as the plants leave the first unit they will immediately enter the second unit, the two units having their plant tunnels 28 arranged in alignment one with the other as best shown in Figure 4.

The tandem-units are preferably flexibly suspended from, and beneath, the main frame of the tractor by cables 29 that pass over or around pulleys 30 and are connected to the clevis 33 by a link 34, the clevis being connected to a lever 31 which is pivoted at 32 to a frame beam 1. A second clevis 35 is connected to the lever 31 and to a spring 36 which is in turn connected to one element 37 of a take-up swivel whose screw 38 passes through a lug 39 and has a shouldered eye 40. By inserting a bar in the eye and turning the screw 38 the tension of the spring, as well as the elevation of the picking units 26—27, may be adjusted.

The picker drive-shafts 41 are connected by means of telescopic shafts 42 and universal joints 43 with a stub shaft 44 mounted in suitable bearings and driven from a shaft 47 by bevel gears 46. Each shaft 47 is mounted in suitable bearings 45 and is driven by a sprocket and chain drive 48 from the engine transmission shaft (see Figure 2). Suitable clutches 49 are provided in shafts 19 and 47 so that either or all may be rendered operative or ineffective at will.

A set of blowers 50—51 is provided for each unit 26, 27, those for one unit being mounted at one side of the tractor, while those for the other unit are mounted at the other side, thus tending to balance the vehicle laterally. 52 designates the blower shafts (one for each pair of blowers 50—51). They are driven by belt and pulley drives 53 from the engine shaft so as to operate continuously while the engine is operating.

The main suction duct 54 of a unit connects with its blower 51 while the auxiliary duct 55 connects with its blower 50 through the salvaging duct 59. Cotton from blowers 51 is conducted through separate ducts 56 each to a bag hanger 57 so as to deliver into the bags (not shown) as will be clearly understood by reference to the aforesaid patents. The blowers 50 have their offtake ducts 60 arranged to deliver the cotton salvaged to a third bag holder 61 at the side of the machine.

The units 26—27 may be controlled as to elevation by means of a hand lever 58 suitably connected to the tandem unit.

The operation of the machine is, in principle, the same as that of the patents aforesaid, except that instead of having to have the machine pass over the rows of plants twice in order to pick them clean, only one trip is necessary since the second picking mechanism 27 will gather the cotton missed by the first unit 26 immediately after the first unit 26 has passed over a plant.

The tractor when not used in connection with cotton picking mechanism can be used for various other purposes such as drawing plows, cultivators and the like.

Figure 7:
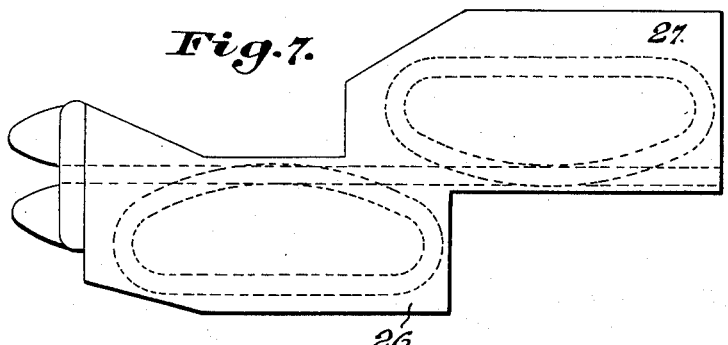
Fig. 7 is a diagrammatic plan view of a further modification of the invention.

In the event the boll crusher 66 is not to be used, the front of the rear picking unit may overlap the rear part of the front picking unit as shown in Figures 4 and 7 thereby decreasing the combined length of the tandem picking units.

In order to salvage such cotton as may be thrown from the spindles in passing around the rear sprockets, I have provided ducts 55 for reclaiming this cotton by means of suction created by blower fans 50. In Patent No. 2,058,513 to J. D. Rust et al., means are provided for compelling the spindles to bring all the cotton into the main delivery. But as pointed out in a subsequent patent, No. 2,023,491, to J. D. Rust et al., the grade of the cotton is greatly improved by providing an opening at the rear of the machine for the discharge of the leaf trash from the spindles by centrifugal force as they pass around the rear sprockets. Experience has shown, however, that the same centrifugal force will also throw off a small percentage of the cotton at this point. Therefore, the above described salvage means have been provided for reclaiming this cotton and saving it in a separate receptacle.

I have also provided a device for salvaging any cotton that may drop from the plant after the machine has passed over it. This device consists mainly of two downwardly inclined sheet metal plates 62 at the rear of the second unit in line with the plant tunnel (see Figs. 1, 2, and 3) to the extensions 64 of the salvage suction pipes 59 the plates 62 are secured at 63. The nozzles 65 extend close to the ground at each side of the plant row and are staggered (see Fig. 2) so they cannot pull at the same cotton at the same time.

Experience has shown that the salvage device at the rear of the machine will draw in some dirt which, unless trapped, will collect in the elbows adjacent the ground. I have, therefore, provided a trap 67 with flap valves or doors 68, hinged at 70 and held closed by springs 69 (see Fig. 8). These doors 68 may be opened by the operator pulling a cord 74. If desired, the dirt may be discharged automatically by the device shown in Figs. 9 and 10 wherein is shown a ground wheel 71 that operates a pocketed drum that acts as a rotary valve in the outlet of the trap 73. The drum or hub 72 fits the shell closely and so prevents passage of air into the trap 73 from below, on the same principle as a revolving door.

As indicated at 66 in Figure 5, the rear unit 27 may be provided with a suitable boll crusher, such for example as that disclosed in Pat. No. 2,058,514, issued Oct. 27, 1936. Thus the front unit 26 will gather the well-opened cotton and the boll crusher will break open the cracked and unopened bolls so that the cotton from such crushed bolls can be gathered by the rear unit. It is understood that this arrangement could be used successfully only after frost has deadened the plants.

While I have shown three units carried by the tractor in Fig. 5, this illustration is primarily for the purpose of showing the different positions where a unit or units may be located. Ordinarily only two units will be furnished with one tractor and these may be connected in tandem, as units 26—27, or unit 27 may be located at the side opposite unit 26, as unit 26'.

This application is a continuation in part of my application Ser. No. 141,168, filed May 6, 1937, and a continuation in part of my application Ser. No. 160,926, filed Aug. 25, 1937.

From the foregoing description, taken in connection with the accompanying drawings, it is thought that the construction, operation and advantages of the present invention will be apparent to those skilled in the art.

What I claim is:

1. A self-propelled tractor type machine, embodying an elevated frame tractor designed to straddle a plurality of rows of plants, a right and a left picker unit of the character described, each unit having a plant tunnel and cotton picking mechanism operating on the plants as they are passed through the tunnels, said units being arranged in tandem to operate on one row of plants at a time, and means to mount said units below the frame of the tractor, said units being mounted with their principal combined weight disposed at one side of the central vertical plane of the tractor, cotton receivers mounted on the tractor and having their principal combined weight disposed at the other side of said plane, suction-blowers for conveying the cotton from one unit to one receiver, and other suction-blowers for conveying the cotton from the other unit to the other receiver, said blowers for the respective units being mounted on opposite sides of the machine for balancing purposes.

2. A self-propelled tractor type machine, comprising an elevated frame tractor having two traction wheels designed to straddle two rows of plants and steering wheels designed to pass between said two rows, two cotton picking units, each including a plant tunnel and cotton gathering instrumentalities, said units being mounted beneath said frame in tandem relation, the forward unit being located in advance of one traction wheel and the other unit being located between the two traction wheels.

3. A self-propelled tractor type machine, comprising an elevated frame tractor having two traction wheels designed to straddle two rows of plants and steering wheels designed to pass between said two rows, two cotton picking units, each including a plant tunnel and cotton gathering instrumentalities, said units being mounted beneath said frame in tandem relation, the forward unit being located in advance of one traction wheel and the other unit being located between the two traction wheels, a bag holder carried by the frame at a position between and to the rear of the traction wheels and a second bag holder located to the rear of said traction wheels and on the side of the tractor opposite that at which the first of said units is located.

4. In cotton picking machines, a two-row-straddling tractor having an elevated frame on which is mounted the power plant, transmission, differential and driving axles of the differential, traction wheels mounted at the outer side toward the rear of the frame, a steering truck mounted centrally at the front of the frame, a cotton picking unit mounted beneath the frame to one side of said truck and in front of the adjacent traction wheel, and a second unit mounted beneath said frame between said traction wheels and to the rear of and in tandem relation to the first picking unit.

5. A self-propelled tractor type machine, comprising an elevated frame tractor having two traction wheels designed to straddle two rows of plants and steering wheels designed to pass between said two rows, two cotton picking units, each including a plant tunnel and cotton gathering instrumentalities, said units being mounted beneath said frame in tandem relation, the forward unit being located in advance of one traction wheel and the other unit being located between the two traction wheels, a bag holder for each cotton picking unit, means for separately delivering the gathered cotton from the units into bags on said holders, cotton salvaging means cooperatively associated with said units, a third bag holder, and means to deliver the cotton salvaged from both units into a bag on the third bag holder.

6. A self-propelled tractor type machine, comprising an elevated frame tractor having two traction wheels designed to straddle two rows of plants and steering wheels designed to pass between said two rows, two cotton picking units, each including a plant tunnel and cotton gathering instrumentalities, said units being mounted beneath said frame in tandem relation, the forward unit being located in advance of one traction wheel and the other unit being located between the two traction wheels, a bag holder carried by the frame at a position between and to the rear of the traction wheels, a second bag holder located to the rear of said traction wheels and on the side of the tractor opposite that at which the first of said units is located, cotton salvaging means located to the rear of the tandem units and including suction devices to gather fallen cotton, a third bag holder, and means cooperative with the several picking units and said salvaging device for separately delivering the picked and gathered cotton from the two units into the bag holders at the rear thereof, and means for delivering salvaged cotton from said salvaging means to the third bag holder.

7. In a cotton gathering machine, a wheeled vehicle, two complete cotton picking units each including a plant tunnel and cotton gathering instrumentalities, said units being mounted in tandem, a separate bag holder carried by the vehicle for each unit, a salvaging device at the rear of the rear tandem-unit, a separate bag holder for said salvaging device, and means including suction ducts and blowers for conveying cotton from the two units and from the salvaging device separately to their respective bag holders.

8. In a cotton gathering machine, a wheeled vehicle, two complete cotton picking units each including a plant tunnel and cotton gathering instrumentalities, said units being mounted in tandem, a separate bag holder carried by the vehicle for each unit, a salvaging device at the rear of the rear tandem-unit, a separate bag holder for said salvaging device, means including suction ducts and blowers for conveying cotton from the two units and from the salvaging device separately to their respective bag holders, and auxiliary suction ducts connecting the units respectively with the salvaging ducts to deliver dropped cotton from within the units to the third bag holder.

9. In a cotton picking machine wherein there is provided a tunnel through which the plants are passed; a cotton salvaging means constructed for location in the rear of the tunnel for picking up loose or fallen cotton, said salvaging means comprising longitudinally extending boards inclined downwardly and toward each other but spaced apart for passage of plants leaving the tunnel and suction nozzles at the rear of the boards.

10. In a cotton picking machine wherein there is provided a tunnel through which the plants are passed; a cotton salvaging means constructed for location in the rear of the tunnel for picking up loose or fallen cotton, said salvaging means comprising longitudinally extending boards inclined downwardly and toward each other but spaced apart for passage of plants leaving the tunnel and suction nozzles at the rear of the boards, the nozzle at the rear of one board being located in advance of the nozzle at the rear of the other board.

11. In a cotton picking machine wherein there is provided a tunnel through which the plants are passed; a cotton salvaging means constructed for location at the rear of the tunnel for picking up loose or fallen cotton, said salvaging means comprising longitudinally extending boards inclined downwardly and toward each other but spaced apart for passage of plants leaving the tunnel and suction nozzles at the rear of the boards, the nozzle at the rear of one board being located in advance of the nozzle at the rear of the other board, said nozzles being arranged to draw from opposite sides of the plant row.

12. In a cotton picking machine wherein there is provided a tunnel through which the plants are passed; a cotton salvaging means constructed for location in the rear of the tunnel for picking up loose or fallen cotton, said salvaging means comprising longitudinally extending boards inclined downwardly and toward each other but spaced apart for passage of plants leaving the tunnel and suction nozzles at the rear of the boards, and means adjacent the suction nozzles to trap dirt drawn in with the cotton.

13. In a cotton picking machine wherein there is provided a tunnel through which the plants are passed; a cotton salvaging means constructed for location at the rear of the tunnel for picking up loose or fallen cotton, said cotton salvaging means including a horizontal duct adjacent the ground, a nozzle at the entrant end of said duct and a riser duct at the other end of said horizontal duct, and a dirt trap at the juncture of said horizontal and riser ducts.

14. In a cotton picking machine wherein there is provided a tunnel through which the plants are passed; a cotton salvaging means constructed for location at the rear of the tunnel for picking up loose or fallen cotton, said cotton salvaging means including a horizontal duct adjacent the ground, a nozzle at the entrant end of said duct and a riser duct at the other end of said horizontal duct, a dirt trap at the juncture of said horizontal and riser ducts, said trap including a downwardly extending receptacle, and a rotary valve having dirt-receiving pockets to discharge the dirt from said receptacle and at the same time restraining air from entering the receptacle past the valve.

JOHN D. RUST.